Patented June 5, 1934

1,961,912

UNITED STATES PATENT OFFICE 1,961,912

PRODUCTION OF KETONES

Wilhelm Querfurth, Constance, Germany, assignor, by mesne assignments, to the firm of Deutsche Gold- und Silber - Scheideanstalt vormals Roessler, Frankfort - on - the - Main, Germany, a corporation of Germany No Drawing. Application January 25, 1930, Serial No. 423,541. In Germany January 29, 1929

19 Claims. (Cl. 260—134)

The present invention relates to the production of ketones from aliphatic alcohols with two or more C-atoms combined together or their derivatives, such as, for example aldehydes, esters, ethers, acetals and so forth.

According to earlier methods of the applicant, it has been possible to convert bodies of the character above referred to into ketones by the action of water vapour at higher temperatures in the presence of catalysts. As catalysts, metal oxygen compounds, preferably mixtures of different metal oxygen compounds, for example, those of heavy metals such as iron oxide, and of light metals such as, for example, oxides of the alkaline earths in the presence or absence of metals, for example of iron, have been used.

Further experiments have shown that the use of oxygen compounds of nickel and cobalt affords particular advantages in the ketonizing of initial substances of the character referred to. Preferably the said oxygen compounds, for example nickel oxide, or substances containing the same, in combination with other oxygen compounds of metals, for example those of the sixth, seventh and eighth group, of the periodic system, are used if desired with the co-operation of metals, which latter can be used with advantage as carriers for the metal oxygen compounds.

It has been shown that for example, iron oxides which have proved particularly good ketonizing catalysts can be further considerably improved by the co-operation of, for example nickel oxide, cobalt oxide, or both.

A catalyst according to the invention can, for example, be prepared in such a manner that spongy iron having a large surface is thoroughly rusted over by exposure in damp air, preferably moistened with weak acetic acid and then saturated with a solution of commercial nickel carbonate in acetic acid, dried, and thereupon subjected to a subsequent heating to high temperatures, for example 500° C. It is thus possible to use for example nickel carbonate equal to about 10 per cent of the weight of the spongy iron. Likewise it is possible, for example to start with spongy iron which by treatment with water vapour or, if desired, with mixtures of water vapour and air, or also with atmospheric oxygen alone at higher temperatures has been more or less thoroughly, if desired completely oxidized throughout and to apply auxiliary catalysts such as for example, nickel oxide, cobalt oxide, or both to this basic catalytic body. It is possible for example to use commercial nickel carbonate containing cobalt for the production of the catalysts.

The applicant has shown in his earlier methods that catalytically-acting heavy metal oxides can be considerably improved by the addition of other metal oxides, in particular light metal oxides such as for example those of the alkaline earth metals (auxiliary catalysts).

Comparative experiments have shown that catalysts which have been prepared with the co-operation of oxygen compounds of nickel and cobalt as for example the previously described iron oxide-nickel oxide-catalysts, surpass under many conditions those which are produced for example from iron oxide with the co-operation of alkaline earth oxides, for example calcium oxide.

The catalysts prepared according to the invention act extraordinarily energetically, so that by use of the same the ketonizing of the reaction mixture is completed more rapidly than, for example, when using corresponding iron oxide-calcium oxide-catalysts. A further advantage resides therein that the operation can be carried out at lower temperatures. Comparative experiments have shown that for example ketonizing with the use of the above catalysts can be carried out at 425 to 490° C., whilst for the ketonizing of corresponding quantities of initial substances with the use of iron oxide-calcium oxide-catalysts temperatures of 510° to 580° C. were required. The possibility of working at lower temperatures has the advantage that by this means certain side reactions can be repressed or obviated, an advantage which is of particular importance when initial substances containing admixtures such as occasionally occur in practice are treated.

Example

A mixture of 18,830 kg. of ethyl alcohol and 78,400 kg. of water-vapour is conducted at an average velocity of 78,5 kg. of ethyl alcohol and 326 kg. of water vapour per hour over a catalyst prepared according to the above details by rusting of spongy iron in air and impregnating with a solution of commercial nickel carbonate in acetic acid. 9510 kg. of acetone are obtained, which corresponds to a yield of 93,3 per cent, whilst 1,680 kg. of unchanged ethyl alcohol are recovered.

It has been shown that the catalysts of the character claimed herein act particularly favourably in the treatment of initial substances which do not constitute pure alcohols of pure aldehydes, that is to say, for example, with esters of various kinds, with first runnings of spirit rectification which may contain bodies such as for example methanol, ethyl alcohol, esters of these alcohols, acetaldehydes, acetals and para-aldehyde, side by side, further, for example, in the treatment of high boiling esters of residual acids such as, for example, propionic acid, butyric acid, and other esters, whilst in the latter case besides acetone, the corresponding higher ketones are formed, in part also in the form of mixed ketones, such as for example, methyl ethyl ketone, methyl propyl ketone, and so forth. The presence of oxygen compounds of nickel or cobalt have been shown to be particularly favourable in the treatment or co-treatment of substances which cannot be directly ketonized. The same also ensure the production of good yields with the avoidance of disturbing side reactions in the treatment of such initial substances.

The nickel oxide, cobalt oxide, or both, to be used according to the invention in combination with other metal oxides, for example those of iron, if desired, various other metal oxides such as for example iron oxide and manganese oxide or, for example catalysts containing iron oxide and calcium oxide can also be used in combination with catalysts which are free from nickel oxide as, for example, iron oxide-calcium oxide-iron catalyst. This can be effected for example in that individual parts of the contact chamber for example those heated to low temperatures are charged with nickel-containing catalyst, whilst the remainder of the contact chamber heated to higher temperatures is charged with, for example catalysts containing iron oxide and calcium oxide. The operation may also for example be such that contact chambers which are charged with different catalysts are arranged one behind the other for example in such a manner, that the reaction mixture to be ketonized is first conducted over catalysts free from nickel and finally over particularly active nickel-containing catalysts.

I claim:—

1. The process of producing ketones which comprises mixing water vapor and the vapor of an aliphatic alcohol having at least two carbon atoms joined together and reacting said mixture at a temperature up to about 500° C. in the presence of a catalyst essentially containing iron oxide and nickel oxide.

2. The process of producing ketones which comprises establishing a stream of water vapor and the vapor of an aliphatic alcohol having at least two carbon atoms joined together, passing said stream of water vapor and alcohol vapor over a catalyst essentially containing iron oxide and nickel oxide, and maintaining a temperature up to about 500° C. in said catalyst and vapor to cause the production of ketones.

3. The process of producing ketones which comprises establishing a body of water vapor and vapor of an aliphatic alcohol having at least two carbon atoms jointed together, and contacting said vapor with a catalyst essentially containing iron oxide and nickel oxide at a temperature up to about 500° C.

4. The process of producing ketones which comprises establishing a body of water vapor and vapor of an aliphatic alcohol having at least two carbon atoms joined together, and contacting said vapor with a catalyst essentially containing iron oxide and nickel oxide within a range of about 400° C. to about 500° C.

5. The process of producing ketones which comprises establishing a stream of water vapor and the vapor of an aliphatic alcohol having at least two carbon atoms jointed together, and contacting said vapor with a catalyst composed of spongy iron having a coat essentially containing iron oxide and nickel oxide at a temperature up to about 500° C.

6. The process of producing ketones which comprises establishing a stream of water vapor and the vapor of an aliphatic alcohol having at least two carbon atoms joined together, and contacting said vapor with a catalyst composed of spongy iron having a coat essentially containing iron oxide and nickel oxide at a temperature within a range from about 400° C. to about 500° C.

7. The process of producing ketones which comprises establishing a body of water vapor and vapor of an aliphatic alcohol having at least two carbon atoms joined together, and contacting said vapor with a catalyst essentially containing oxygen compounds of iron and of nickel at a temperature up to about 500° C.

8. The process of producing ketones which comprises establishing a stream of water vapor and the vapor of an aliphatic alcohol, contacting said vapor with a catalyst composed of spongy iron having a coat essentially containing iron oxide and nickel oxide, said oxide of iron amounting to approximately 10%. of the weight of the spongy iron, and maintaining a temperature of about 400° C. to about 500° C.

9. The process of producing ketones which comprises establishing a body of water vapor and vapor of an aliphatic alcohol having at least two carbon atoms joined together, and contacting said vapor with a catalyst essentially containing iron oxide and nickel oxide at a temperature of about 425° C. to about 490° C.

10. The process of producing ketones which comprises establishing a body of water vapor and vapor of an aliphatic alcohol having at least two carbon atoms joined together, and contacting said vapor with a catalyst essentially containing iron oxide, cobalt oxide and nickel oxide at a temperature up to about 500° C.

11. The process of producing ketones which comprises establishing a body of water vapor and vapor of an aliphatic alcohol having at least two carbon atoms joined together, and contacting said vapor with a catalyst essentially containing iron oxide, an oxygen compound of an alkaline earth metal and nickel oxide at a temperature up to about 500° C.

12. The process of producing ketones which comprises establishing a body of water vapor and vapor of a ketonizable substance and contacting said vapor with a catalyst essentially containing iron oxide and nickel oxide at a temperature up to about 500° C.

13. The process of producing a catalyst for the catalytic production of ketones which comprises rusting spongy iron in damp air with weak acetic acid, impregnating said spongy iron with a solution containing nickel carbonate and acetic acid, drying said impregnated spongy iron, and heating said dried iron at a temperature up to about 500° C. to produce a catalyst for the production of ketones.

14. The process of producing a catalyst for the catalytic production of ketones which comprises rusting spongy iron in damp air with weak acetic acid, impregnating said spongy iron with a solution containing nickel carbonate and acetic acid, controlling the amount of nickel carbonate added to about 10% of the weight of the spongy iron, drying said impregnated spongy iron, and heating said dried iron at a temperature up to about 500° C. to produce a catalyst for the production of ketones.

15. The process of producing a catalyst for the catalytic production of ketones which comprises rusting spongy iron in an atmosphere containing oxygen, impregnating said rusted spongy iron with a solution containing nickel, drying the impregnated iron and heating the dried iron to a temperature up to about 500° C.

16. The process of producing ketones which comprises establishing a body of water vapor and vapor of an aliphatic alcohol having at least two carbon atoms jointed together and contacting said vapor with a catalyst containing essentially an oxygen compound of a metal of the sixth group of the periodic table together with nickel oxide and an oxygen compound of another metal of the eighth group of the periodic table.

17. The process of producing ketones which comprises establishing a body of water vapor and vapor of an aliphatic alcohol having at least two carbon atoms jointed together and contacting said vapor with a catalyst containing essentially an oxygen compound of a metal of the seventh group of the periodic table together with nickel oxide and an oxygen compound of another metal of the eighth group of the periodic table.

18. The process of producing ketones which comprises establishing a body of water vapor and vapor of a ketonizable substance and contacting said vapor with a catalyst containing essentially an oxygen compound of the sixth group of the periodic table together with nickel oxide and an oxygen compound of another metal of the eighth group of the periodic table.

19. The process of producing ketones which comprises establishing a body of water vapor and vapor of a ketonizable substance and contacting said vapor with a catalyst containing essentially an oxygen compound of the seventh group of the periodic table together with nickel oxide and an oxygen compound of another metal of the eighth group of the periodic table.

WILHELM QUERFURTH.